United States Patent [19]
Shintani et al.

[11] Patent Number: 5,203,293
[45] Date of Patent: Apr. 20, 1993

[54] AUXILIARY MECHANISM MOUNTING STRUCTURE FOR AN ENGINE

[75] Inventors: Hidetoshi Shintani; Shouhei Kumano; Kenichi Morizane; Yukio Masuda; Sadashichi Yoshioka; Toshihiko Osumi, all of Hiroshima, Japan

[73] Assignee: Mazda Motor Corporation, Hiroshima, Japan

[21] Appl. No.: 721,713

[22] Filed: Jun. 26, 1991

[30] Foreign Application Priority Data

Jun. 29, 1990 [JP] Japan .................................. 2-171884
Aug. 10, 1990 [JP] Japan .............................. 2-85170[U]
Aug. 10, 1990 [JP] Japan .................................. 2-213449

[51] Int. Cl.⁵ ............................................. F02F 7/00
[52] U.S. Cl. .............................. 123/195 A; 123/198 R; 248/666
[58] Field of Search ............ 123/195 A, 195 E, 198 R, 123/192.1, 192.2; 248/666, 674

[56] References Cited

U.S. PATENT DOCUMENTS 3,018,667  1/1962  Spietz ........................... 123/195 A
5,065,713 11/1991  Seats ............................ 123/195 A

FOREIGN PATENT DOCUMENTS 62-190831 12/1987  Japan .
2070727   9/1981  United Kingdom ................ 248/666

Primary Examiner—Noah P. Kamen
Attorney, Agent, or Firm—Sixbey, Friedman, Leedom & Ferguson

[57] ABSTRACT

An auxiliary mechanism mounting structure for mounting an auxiliary mechanism on an engine has an auxiliary mechanism mounting portion whose bearing rigidity is high in the longitudinal direction of the engine and is low in the vertical direction of the engine so that the auxiliary mechanism is easy to vibrate in the vertical direction of the engine.

9 Claims, 10 Drawing Sheets

AUXILIARY MECHANISM MOUNTING STRUCTURE FOR AN ENGINE

BACKGROUND OF THE INVENTION

1. Field of the Invention

This invention relates to an auxiliary mechanism mounting structure for an engine for mounting an auxiliary mechanism on the engine.

2. Description of the Prior Art

In a power plant for a vehicle which includes an engine, a transmission and the like, power plant vibration is produced. Connections in the power plant are generally increased in rigidity so that the power plant vibration does not resonate in the practical engine speed range. However, in a vehicle in which a differential is provided near the transmission, for instance, a four-wheel drive vehicle, the resonant frequency shifts to a relatively low engine speed range within the practical engine speed range due to difference in weight distribution and large vibration is produced, which gives rise to various problems. For example, noise in the passenger room increases. Accordingly, various measures such as increasing the rigidity of the power plant and improvement of the power plant mounting portion have been taken in order to suppress the power plant vibration.

Further, since the auxiliary mechanisms for the engine, e.g., a compressor for an air conditioner, vibrate in response to the vibration of the engine, it has been proposed to provide the auxiliary mechanism with a dynamic damper which damps the resonation of the auxiliary mechanism. (See Japanese Unexamined Utility Model Publication No. 62(1987)-190831)

However, increase in the rigidity of the power plant involves increase in weight and/or cost, and improvement of the power plant mounting portion encounters a difficulty in setting the properties of the mounting portion so that the power plant vibration is suppressed. Further, providing the auxiliary mechanism with the dynamic damper also involves increase in weight and/or cost.

SUMMARY OF THE INVENTION

In view of the foregoing observations and description, the primary object of the present invention is to provide an auxiliary mechanism mounting structure which can suppress the power plant vibration without substantially increasing cost and weight.

The auxiliary mechanism mounting structure is characterized in that the bearing rigidity of the auxiliary mechanism mounting portion is high in the longitudinal direction of the engine and is low in the vertical direction of the engine so that the auxiliary mechanism is easy to vibrate in the vertical direction of the engine.

The power plant mainly vibrates in the vertical direction, and the auxiliary mechanism mounted on the engine vibrates in various directions, in the vertical direction, the transverse direction the longitudinal direction and the like. Accordingly, when vibration of the auxiliary mechanism in the vertical direction of the engine is only permitted, the auxiliary mechanism vibrates in the vertical direction of the engine in the phase reverse to the vibration of the engine and functions as a dynamic damper.

DESCRIPTION OF THE PREFERRED EMBODIMENTS

Figure 1:
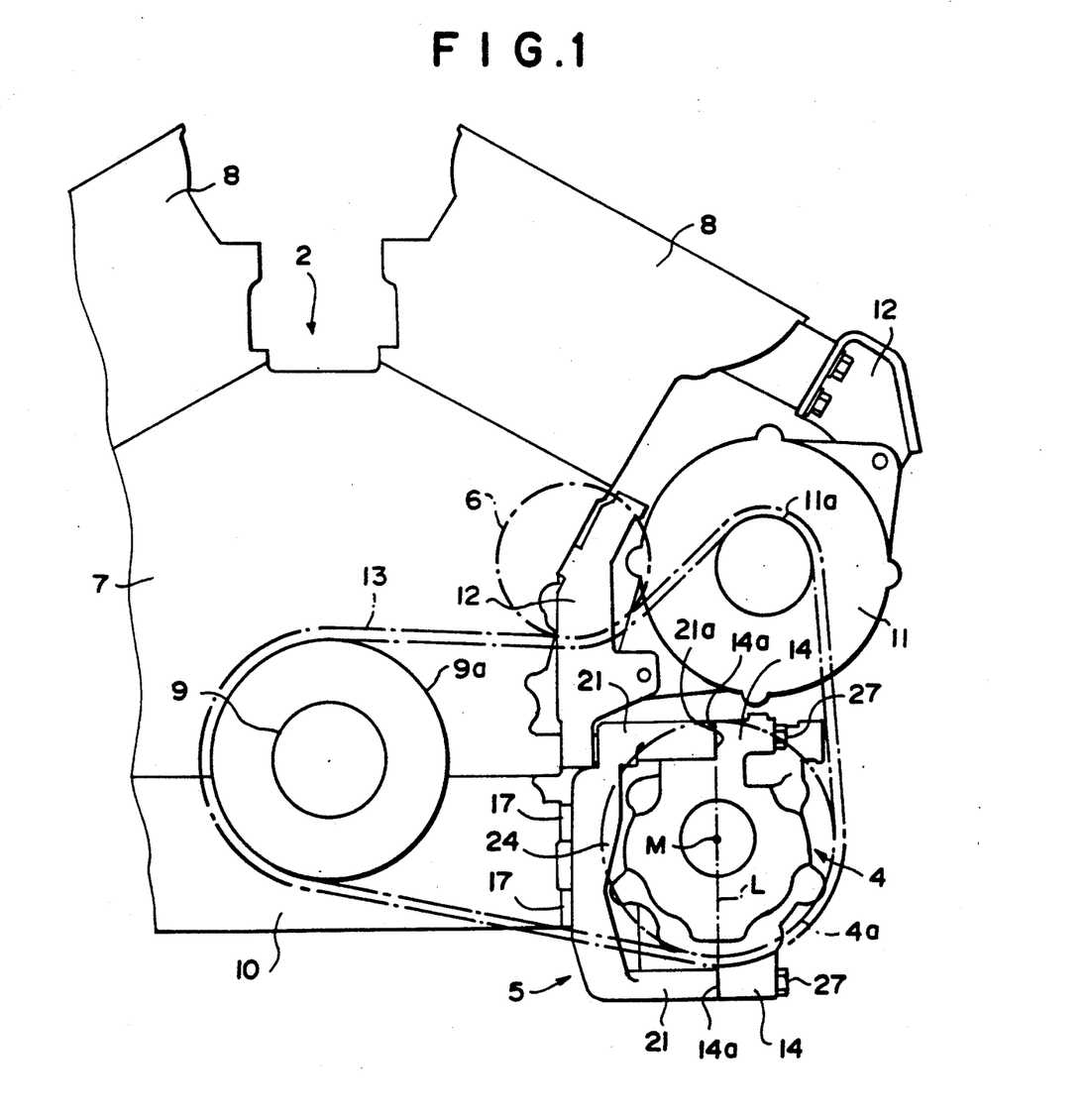
FIG. 1 is a fragmentary front view of an engine provided with an auxiliary mechanism mounting structure in accordance with an embodiment of the present invention.
Figure 2:
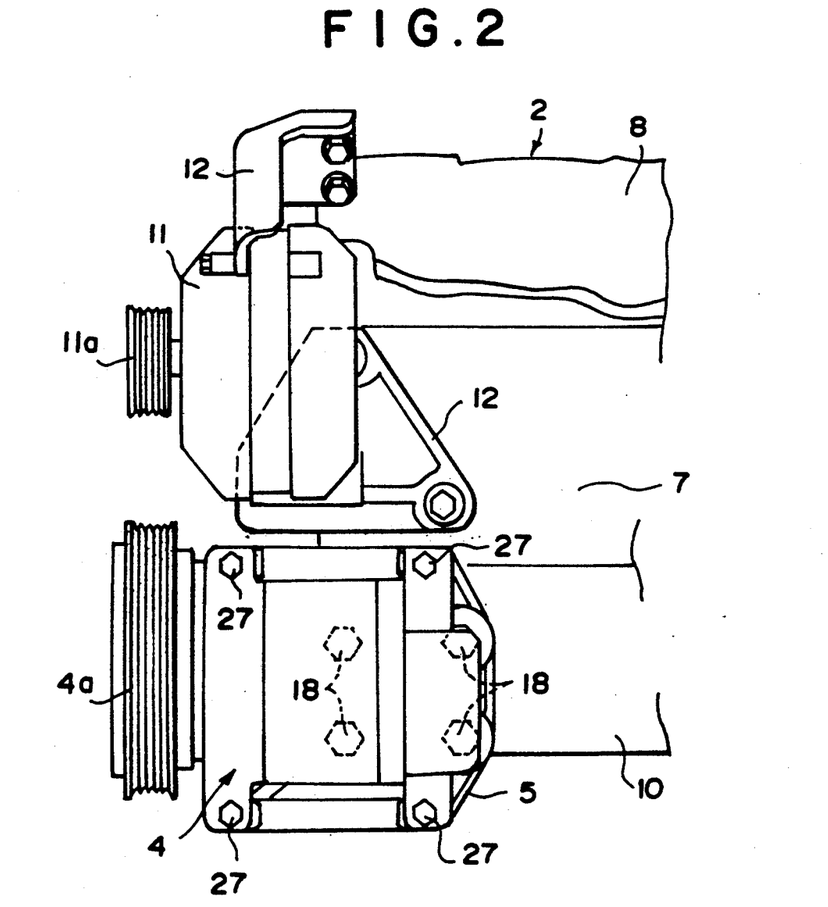
FIG. 2 is a fragmentary side view of the engine.
Figure 3:
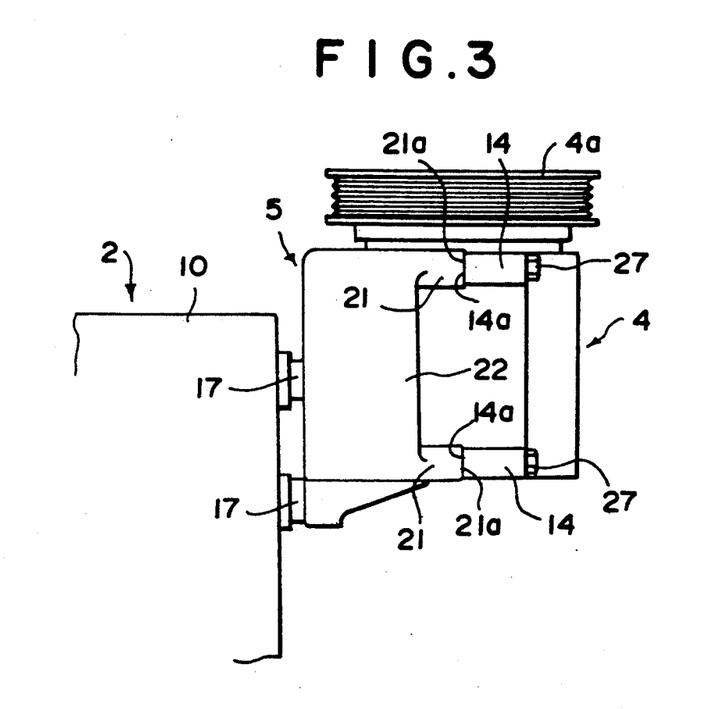
FIG. 3 is a fragmentary bottom view of the engine.

In the auxiliary mechanism mounting structure shown in FIGS. 1 to 3, an auxiliary mechanism is mounted on an engine body by way of a mounting bracket. The left side in FIG. 2 is the front side of the engine body 2.

In FIGS. 1 to 3, an auxiliary mechanism 4 which functions as a dynamic damper is mounted on the front part of a side of an engine body 2 by way of a mounting bracket 5. In this particular embodiment, the auxiliary mechanism 4 is a compressor for an air conditioner, which is preferred in view of its large weight.

In this particular embodiment, the engine body 2 is of V-type and has a pair of cylinder heads 8 mounted on a cylinder block 7 at an angle to each other. A crankshaft 9 extends below the cylinder block 7. A lower block 10 is mounted on the lower surface of the cylinder block 7 and the mounting bracket 5 is fixed to a side surface of the lower block 10.

An alternator 11 (another auxiliary mechanism) is mounted on a side surface of the cylinder block 7 by way of upper and lower brackets 12 above the compressor 4. A driving belt 13 is passed around a crank pulley 9a on the front end of the crankshaft 9 and pulleys 4a and 11a of the compressor 4 and the alternator 11. An idler 6 abuts against the driving belt 13.

Figure 4:
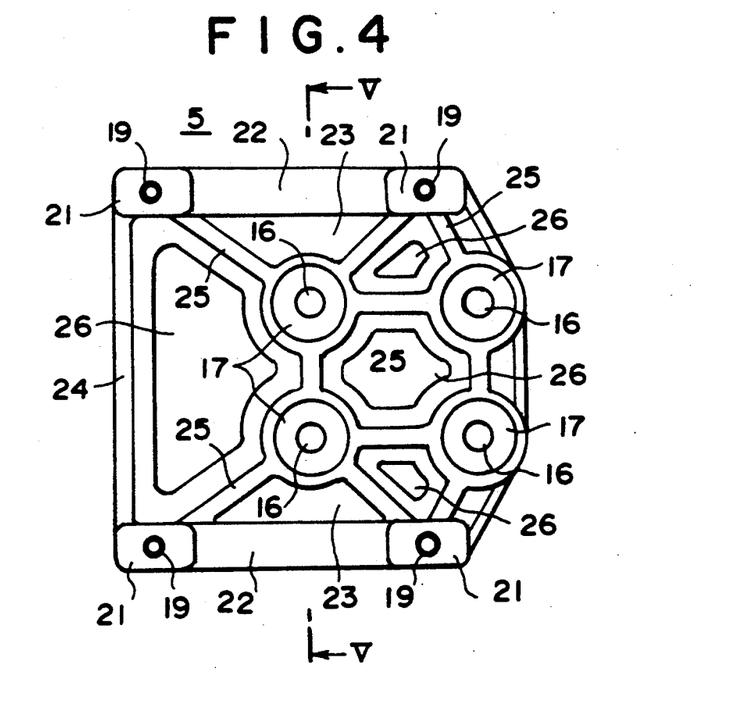
FIG. 4 is a front view of the mounting bracket.
Figure 5:
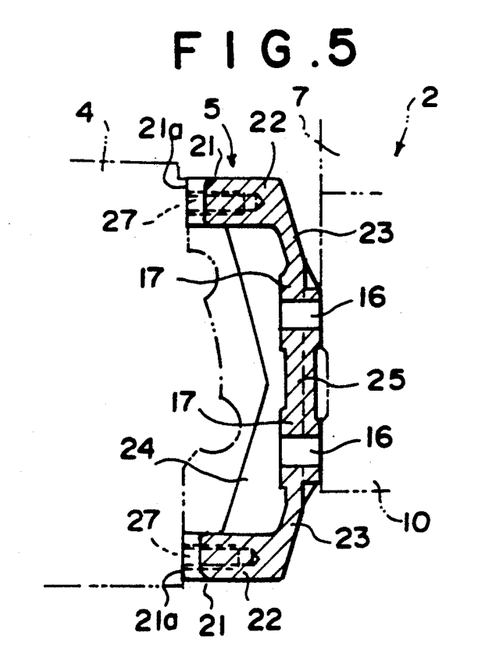
FIG. 5 is a cross-sectional view taken along line V—V in FIG. 4.

As shown in FIGS. 4 and 5, the mounting bracket 5 has a bracket body which is substantially rectangular in shape. For boss portions 17 are formed on the rear part of the bracket body two of them above the center line of the bracket body and the other two below the center line. Each boss portion 17 is provided with a threaded hole 16, and the mounting bracket 5 is fixed to the side surface of the lower block 10 by means of bolts 18 (FIG. 2) screwed into the threaded holes 16.

Four support portions 21 each having a threaded hole 19 are formed on the bracket body two of them on the upper edge and the other two on the lower edge. The rearward two support portions 21 are disposed forward of the rearward two boss portions 17 and the forward two support portions 21 are disposed forward of the forward two boss portions 17. The support portions 21 project outward relative to the boss portions 17 as clearly shown in FIG. 5. The upper support portions 21 are connected with each other by a horizontal rib 22 and the lower support portions 21 are connected with each other by a horizontal rib 22, and the outer end face 21a of each support portion 21 projects outward from the outer end face of the rib 22.

The base portions of the support portions 21 and the horizontal ribs 22 are connected by connecting members 23 which obliquely extend relative to the boss portions 17. The forward upper support portion 21 and the forward lower support portion 21 are connected together by a forward vertical rib 24. The forward vertical rib 24 is smaller than the horizontal rib 22 in width and is recessed at the center thereof as clearly shown in FIG. 5.

Further a connecting rib 25 connects the boss portions 17 with each other and with the support portions 21. Openings 26 are provided in the bracket body at the front and rear portions thereof for the purpose of weight reduction and rigidity reduction.

The compressor 4 has a center of gravity M in a position which is substantially in alignment with the center of the pulley 4a in the longitudinal direction of the engine body 2, and has four abutment portions 14 which are adapted to be opposed to the support portions 21 of the mounting bracket 5 two of them above the center of gravity M and the others below the same. One of the upper abutment portions 14 is positioned forward of the center of gravity M with the other rearward of the same. Similarly, one of the lower abutment portions 14 is positioned forward of the center of gravity M with the other rearward of the same. The compressor 4 is fixed to the mounting bracket 5 with the front end faces 14a of the abutment portions 14 in abutment against the outer end faces of the support portions 21 by bolts 27 which are screwed into the threaded holes 19 in the support portions 21. The front end faces 14a of the abutment portions 14 at which the compressor 4 is fixed to the mounting bracket 5 are positioned near the vertical line L passing through the center of gravity M of the compressor 4.

When the mounting bracket 5 is fixed to the cylinder block 7 by the bolts 18 which ar screwed into the threaded holes 16 in the boss portions 17 and the compressor 4 is fixed to the support portions 21 of the mounting bracket 5 by the bolts 27, the compressor 4 is easily vibrates in the vertical direction since the horizontal ribs 22 extending in the longitudinal direction of the engine are larger than the vertical rib 24 in both width and thickness (i.e., in cross-sectional area) and accordingly, the bearing rigidity of the auxiliary mechanism mounting portion (the mounting bracket 5) is high in the longitudinal direction of the engine and is low in the vertical direction of the engine.

Further, the connecting members 23 which connect the support portions 21 and the boss portions 17 are small in thickness and easily deform in the vertical direction, whereby fine vertical vibration of the compressor 4 is permitted and longitudinal vibration of the same is limited. Accordingly, vibrations at low degrees are produced only in the vertical direction. Further, in this particular embodiment, since the vertical vibration of the compressor 4 is generated by vertical swinging of the support portions 21 of the mounting bracket 5 about the base of the support portions 21 and since the front end faces 14a of the abutment portions 14 at which the compressor 4 is fixed to the mounting bracket 5 are positioned near the vertical line L passing through the center of gravity M of the compressor 4, the vibration of the compressor 4 is effectively transmitted to the engine body 2 and the damping effect of the dynamic damper formed by the compressor 4 is further enhanced.

The sizes and the shape of the mounting bracket 5, i.e., the rigidities of respective parts of the mounting bracket 5, are selected taking into account the weight of the compressor 4 so that the fine vertical vibration is produced in synchronization with the resonant frequency of the power plant vibration and in the phase reverse to the power plant vibration. Thus the compressor 4 functions as a dynamic damper and suppresses the vertical vibration of the engine body 2 and the vibration of the power plant. Since the compressor 4 for the air conditioner is relatively large in mass and positioned at a relatively large distance from the engine body 2, it is preferable as the dynamic damper. The mounting bracket 5 may be fixed to the engine body 2 at two portions longitudinally spaced from each other.

Figure 6:
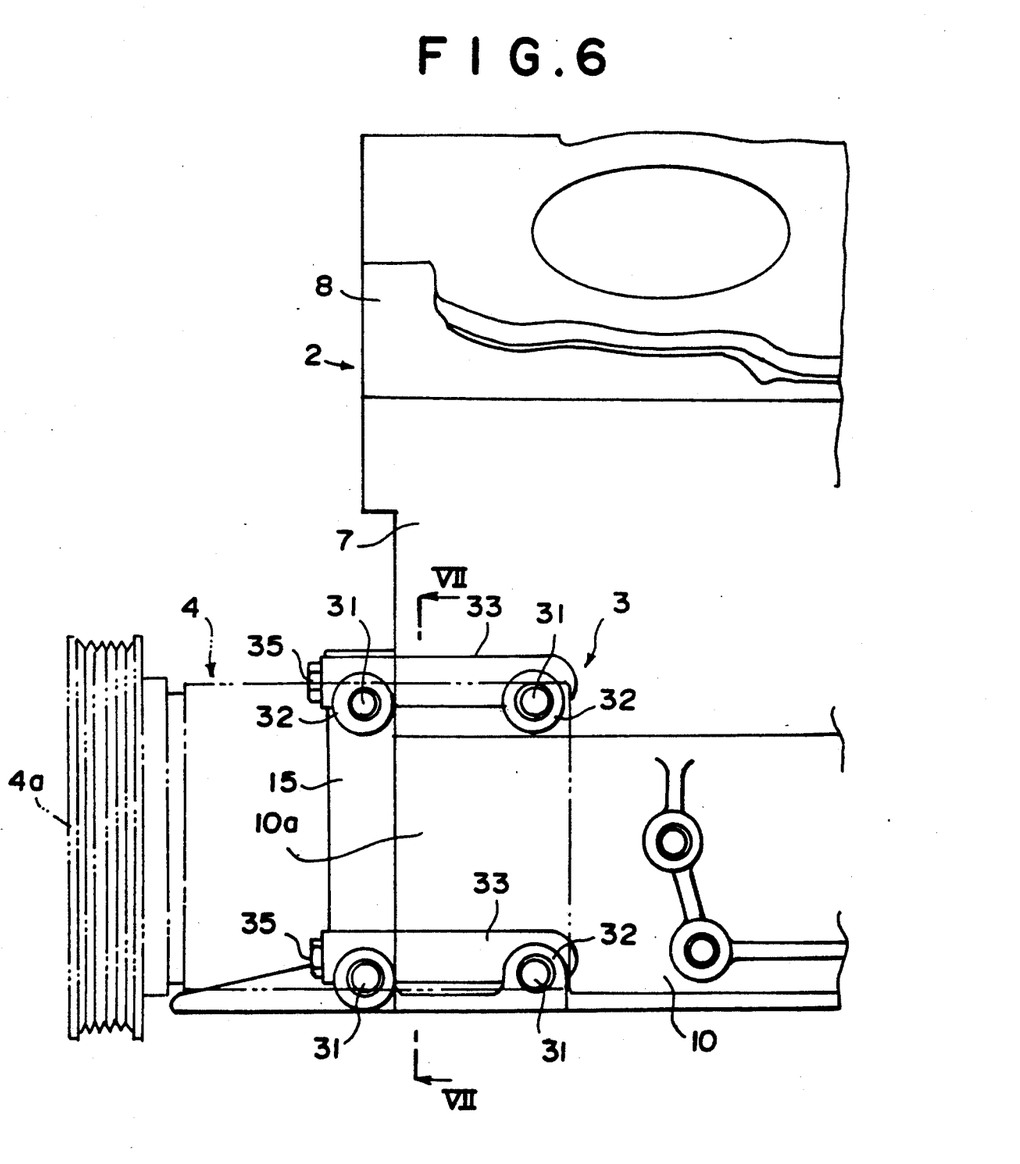
FIG. 6 is a fragmentary front view of an engine provided with an auxiliary mechanism mounting structure in accordance with another embodiment of the present invention.
Figure 7:
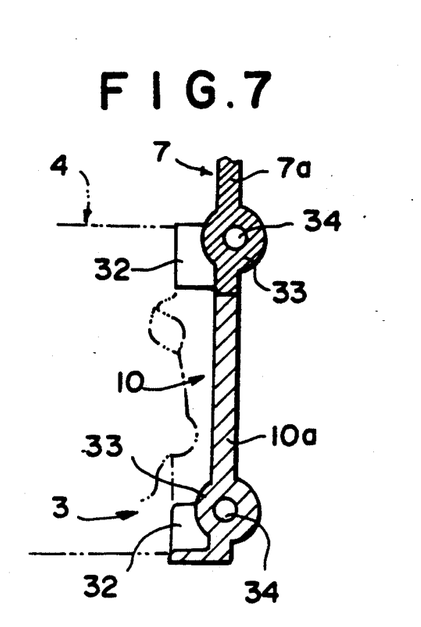
FIG. 7 is cross-sectional view taken along line VII—VII in FIG. 6.

Another embodiment of the present invention in which an auxiliary mechanism is directly mounted on the engine body will be described with reference to FIGS. 6 and 7. In FIGS. 6 and 7, the parts analogous to those shown in FIGS. 1 to 3 are given the same reference numerals and will not be described here.

In FIG. 6, the engine body 2 is of V-type as in the preceding embodiment, and an auxiliary mechanism mounting portion 3 for mounting an auxiliary mechanism 4 is formed on a side wall 7a of the cylinder block 7, a side wall 10a of the lower block 10 and a front cover 15.

The auxiliary mechanism mounting portion 3 includes four boss portions 32 each having a bolt holes 31. The auxiliary mechanism 4 is fixed to the engine body 2 by bolts (not shown) screwed into the bolt holes 31.

The upper boss portions 32 are connected with each other by a horizontal rib 33 and the lower boss portions 32 are connected with each other by a horizontal rib 33, and the outer end face of each boss portion 32 projects outward from the outer end face of the rib 33. The ribs 33 are circular in cross-section and extend in the longitudinal direction of the engine body 2 on the inner and outer sides of the side walls 7a and 10a of the cylinder block 7 and the lower block 10. Further the ribs 33 double as a mounting portion for the front cover 15, and are provided with threaded holes 34 into which bolts for fixing the front cover 15 are screwed.

When the auxiliary mechanism 4 is fixed to the boss portions 32 of the mounting portion 3 by the bolts, the auxiliary mechanism 4 is easily vibrates in the vertical direction since the bearing rigidity of the auxiliary mechanism mounting portion 3 is high in the longitudinal direction of the engine and is low in the vertical direction of the engine by virtue of the horizontal ribs 33 extending in the longitudinal direction of the engine.

Further, the engine body 2 and the front cover 15 are small in wall thickness and easily deform in the vertical direction, whereby fine vertical vibration of the auxiliary mechanism 4 is permitted and longitudinal vibration of the same is limited by the ribs 33. Accordingly, vibrations at low degrees are produced only in the vertical direction.

The sizes and the shape of the mounting portion 3, i.e., the rigidities of respective parts of the mounting portion 3, are selected taking into account the weight of the compressor 4 so that the fine vertical vibration is produced in synchronization with the resonant frequency of the power plant vibration and in the phase reverse to the power plant vibration. Thus the auxiliary mechanism 4 functions as a dynamic damper and suppresses the vertical vibration of the engine body 2 and the vibration of the power plant.

Various auxiliary mechanisms other than the air conditioner compressor such as an alternator, an oil pump and the like can function as a dynamic damper. Since the characteristics of vibration change with weight of the auxiliary mechanism, the bearing rigidity distribution of the auxiliary mechanism mounting portion should be changed according to the weight of the auxiliary mechanism so that the fine vertical vibration of the auxiliary mechanism is produced in synchronization with the resonant frequency of the power plant vibration and in the phase reverse to the power plant vibration.

Now still other embodiments of the present invention in which a damping means which damps the vertical vibration of the auxiliary mechanism thereby enhancing the damping effect of the dynamic damper formed by the auxiliary mechanism is provided will be described with reference to FIGS. 8 to 13, hereinbelow. In FIGS. 8 to 13, the parts analogous to those shown in FIGS. 1 to 7 are given the same reference numerals and will not be described here.

Figure 8:
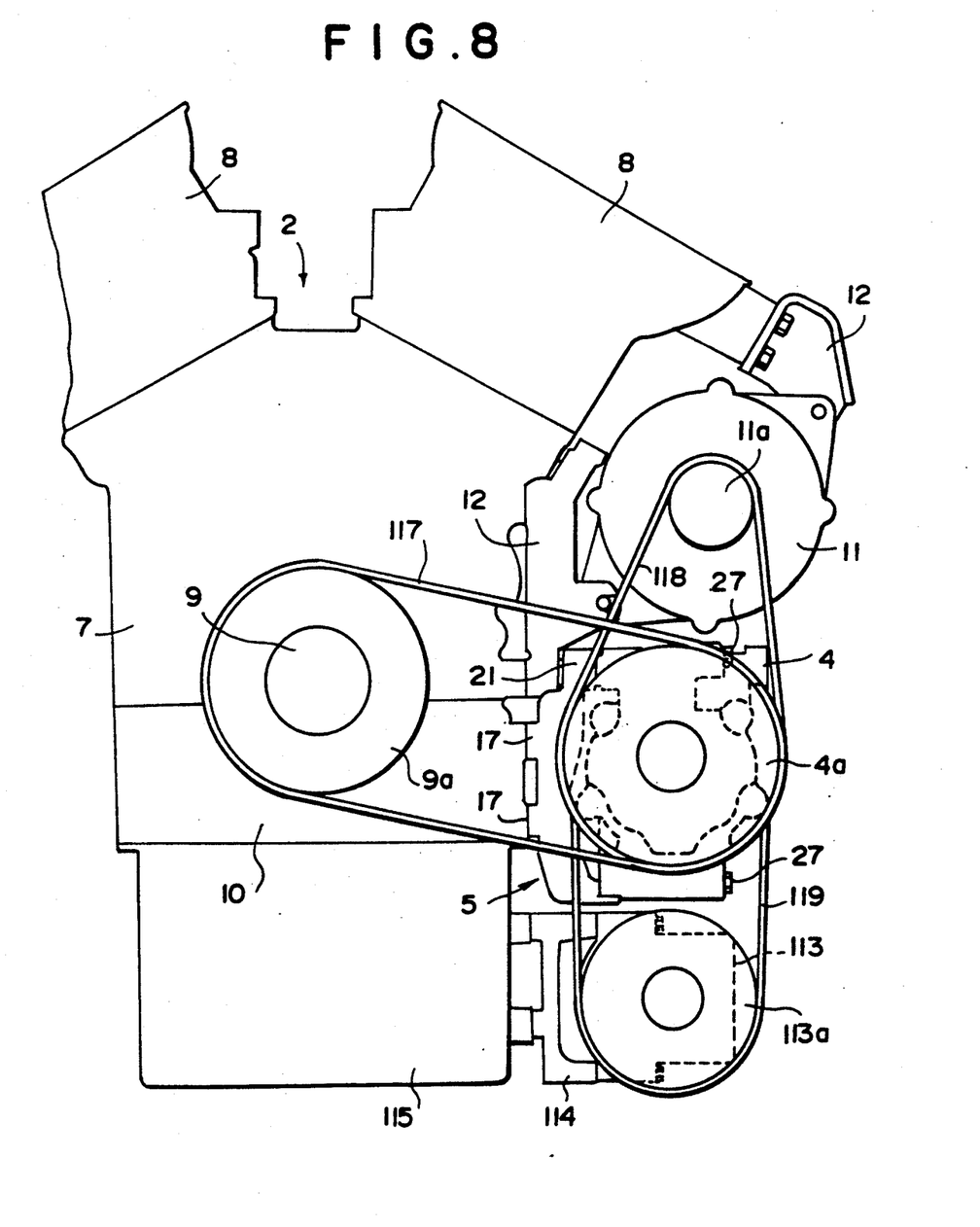
FIG. 8 is a fragmentary front view of an engine provided with an auxiliary mechanism mounting structure in accordance with still another embodiment of the present invention.
Figure 9:
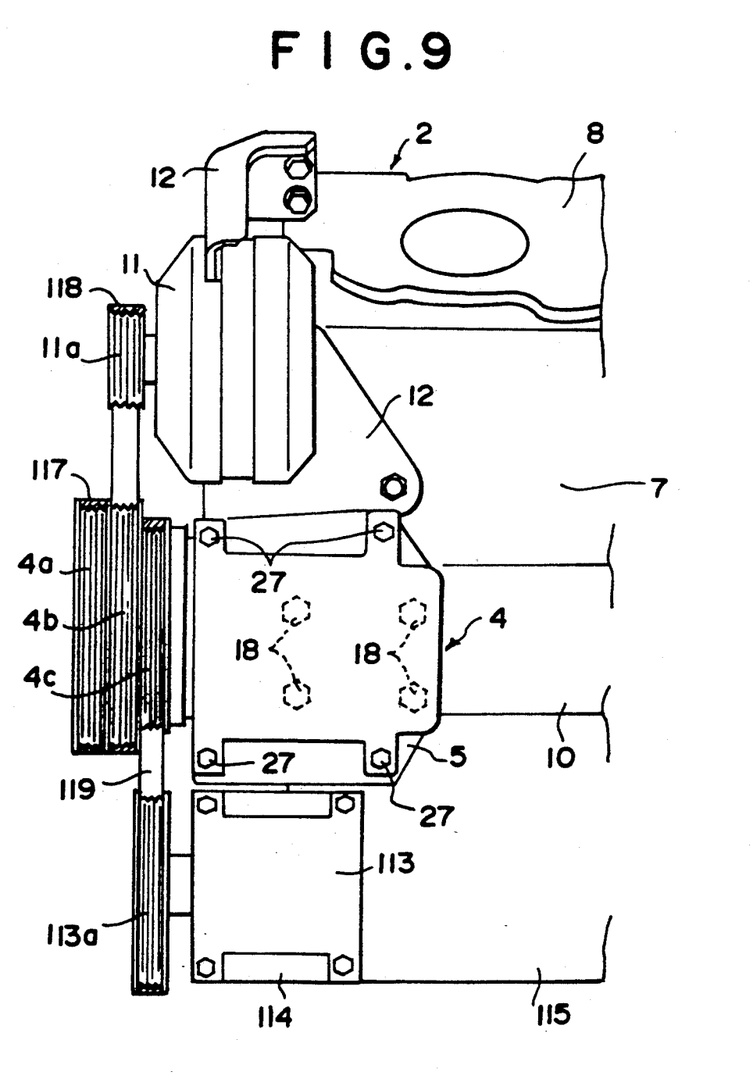
FIG. 9 is a fragmentary side view of the engine.

In the embodiment shown in FIGS. 8 and 9, driving belts are used as the damping means.

In FIGS. 8 and 9, an air conditioner compressor 4 which acts as a dynamic damper in the manner described above is mounted by way of a mounting bracket 5 which is the same as that shown in FIG. 4.

Further, an alternator 11 is mounted on the cylinder block 7 above the compressor 4 and an oil pump 113 for a power steering system (not shown) is mounted on one side of an oil pan 115 by way of an oil pump mounting bracket 114. The oil pump 115 is fixed to the lower side of the lower block 10. A first driving belt 117 is passed around the pulleys 9a and 4a for the crankshaft 9 and the compressor 4. The compressor 4 has second and third pulleys 4b and 4c in addition to the first pulley 4a, and a second driving belt 118 is passed around the second pulley 4b of the compressor 4 and the pulley 11a of the alternator 11. Further, a third driving belt 119 is passed around the third pulley 4c of the compressor 4 and a pulley 113a for the oil pump 113. In this particular embodiment, the second and third driving belts 118 and 119 function as the damping means for damping the vertical vibration of the compressor 4.

That is, the distances between the pulleys change and the tensions of the second and third driving belts 118 and 119 increase and decrease in response to the vertical vibration of the compressor 4, whereby the vertical vibration of the compressor 4 is damped.

Though, in this embodiment, the vertical vibration of the compressor 4 is damped by both the second and third driving belts 18 and 19 which pull the compressor 4 in opposite directions, the vibration of the compressor 4 may be damped by only one of the second and third driving belts 18 and 19. In such a case, the vibration of the compressor 4 is damped only in one direction.

Figure 10:
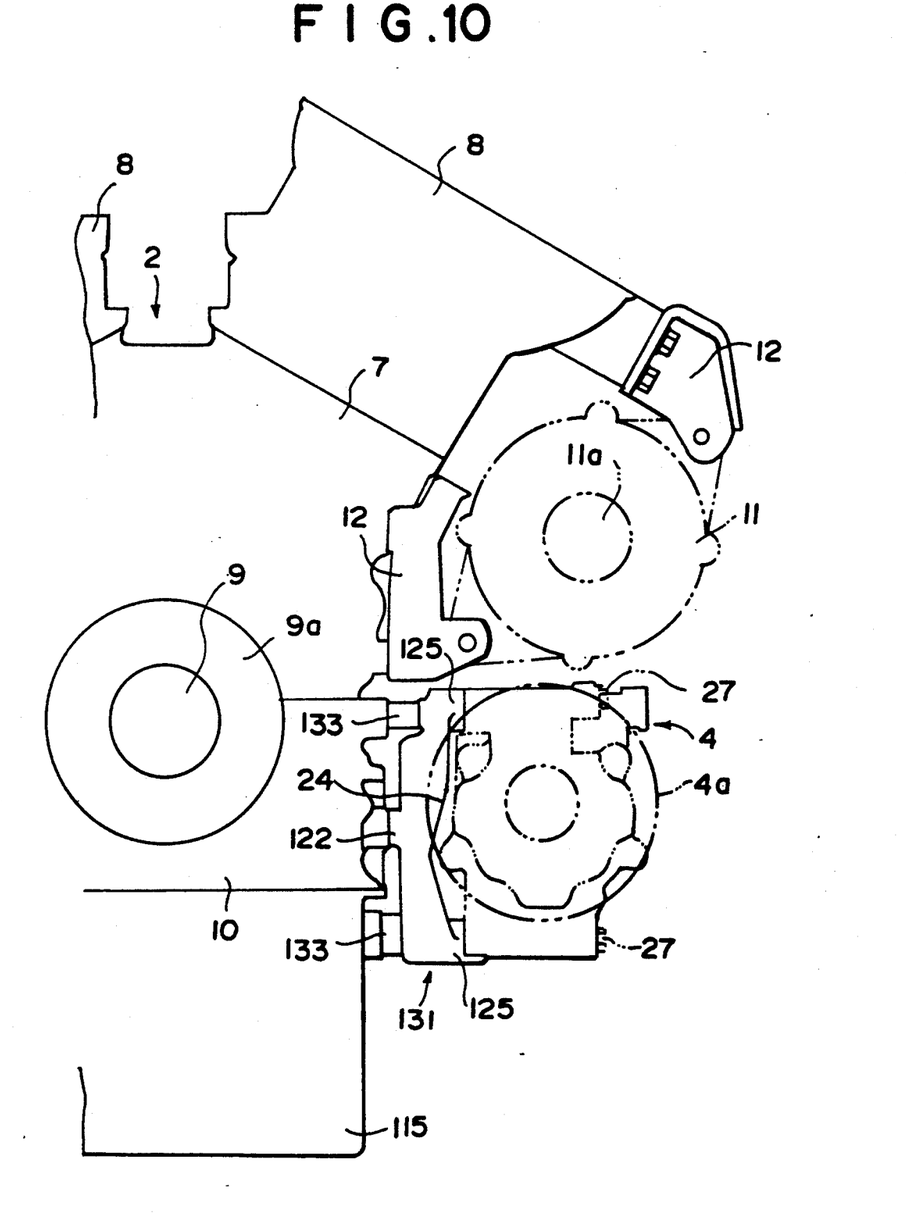
FIG. 10 is a fragmentary front view of an engine provided with an auxiliary mechanism mounting structure in accordance with still another embodiment of the present invention.
Figure 11:
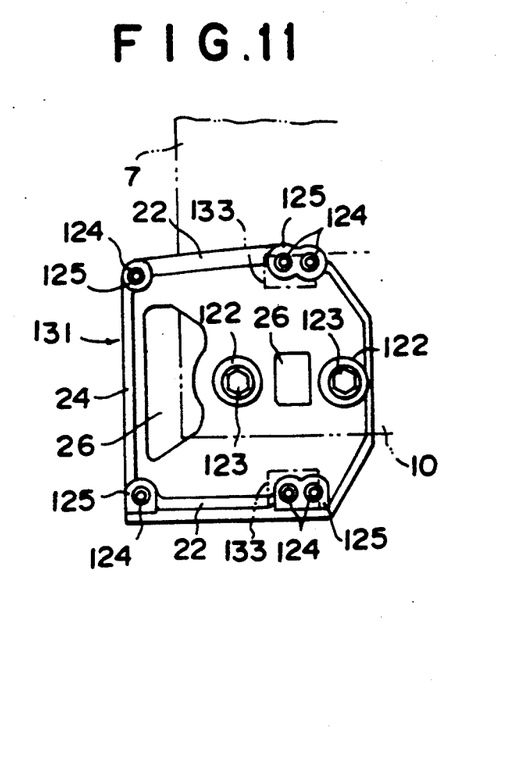
FIG. 11 is a front view of the mounting bracket.

In the embodiment shown in FIGS. 10 and 11, an elastic body is used as the damping means.

In this embodiment, the compressor 4 is mounted on the side surface of the engine body 2 by way of an auxiliary mechanism mounting bracket 131 shown in FIG. 11.

As shown in FIG. 11, the mounting bracket 131 has a bracket body which is substantially rectangular in shape. A pair of boss portions 122 are formed in the rear part of the bracket body spaced from each other in the longitudinal direction of the engine body 2 along the longitudinal center line of the bracket body. The boss portions 122 are provided with bolt holes 123 and the bracket 131 is fixed to the side of the lower block 10 by bolts 123 passed through the bolt holes 123.

Four support portions 125 provided with threaded holes 124 are formed on the bracket body two of them on the upper edge and the other two on the lower edge. The rearward two support portions 125 are disposed forward of the rearward boss portion 122 and the forward two support portions 125 are disposed forward of the forward boss portion 122. As in the preceding embodiments, since the bearing rigidity of the auxiliary mechanism mounting portion (the mounting bracket 131) is high in the longitudinal direction of the engine and is low in the vertical direction of the engine in addition to the fact that the mounting bracket 131 is fixed to the engine body 2 at two points on the longitudinal center line thereof, the compressor 4 easily vibrates in the vertical direction of the engine body 2.

Further a pair of elastic bodies 133 are sandwiched between the mounting bracket 131 and the engine body 2 (between the bracket 131 and the lower block 10 and between the bracket 131 and the oil pan 115. The elastic body 133 is formed of elastic material such as rubber or plastic and is compressed in response to the vertical vibration of the compressor 4, thereby damping the vertical vibration.

Figure 12:
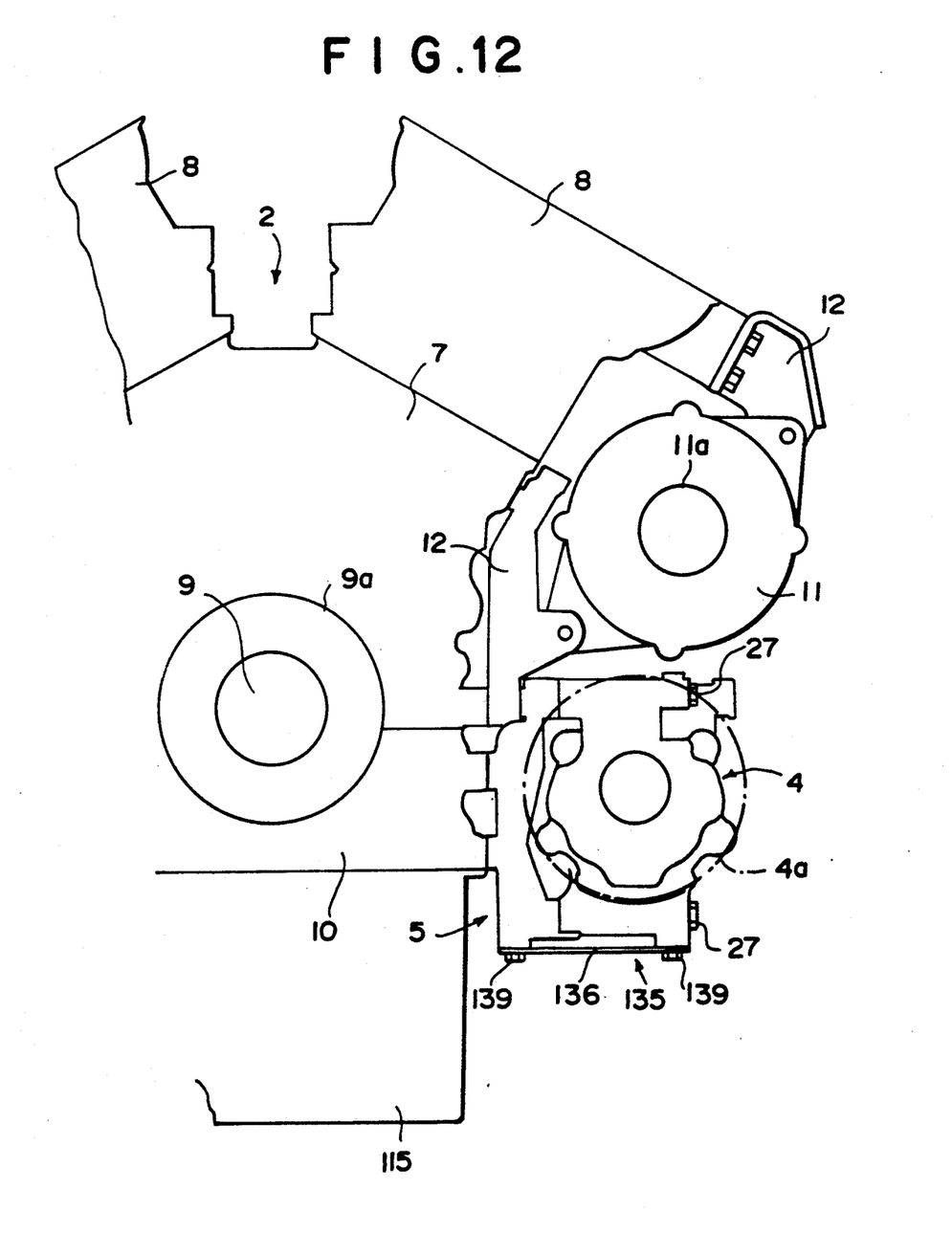
FIG. 12 is a fragmentary front view of an engine provided with an auxiliary mechanism mounting structure in accordance with still another embodiment of the present invention.
Figure 13:
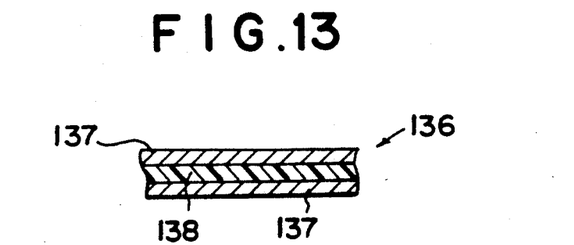
FIG. 13 is an enlarged cross-sectional view of the vibration damping member.

In the embodiment shown in FIGS. 12 and 13, a vibration damping member is used as the damping means.

In this embodiment, the compressor 4 is fixed to the engine body 2 by way of the bracket 5 shown in FIG. 4. This embodiment differs from that shown in FIGS. 1 to 3 in that a vibration damping member 136 connects the lower end portion of the bracket 5 and the compressor 4. The vibration damping member 136 comprises, as shown in FIG. 13, a pair of metal (steel) plates 137 and an elastic material plate 138 laminated together with the elastic material plate 13 8 sandwiched between the metal plates 137. The elastic material plate 138 may be of, for instance, rubber or plastic. The vibration damping member 136 is fixed to the lower face of the bracket 5 and the lower end portion of the compressor 4 at opposite ends by screws 139, and the compressor side end of the vibration damping member 136 vibrates in response to the vertical vibration of the compressor 4 with the other end fixed, thereby damping the vertical vibration of the compressor 4.

We claim:

1. An auxiliary mechanism mounting structure for mounting an auxiliary mechanism on an engine comprising an auxiliary mechanism mounting portion whose bearing rigidity is high in a direction substantially parallel to an axis of a crankshaft of the engine and is low in a substantially transverse direction to that of the axis of the crankshaft of the engine so that the auxiliary mechanism is easy to vibrate in a direction which is substantially transverse to the direction of the axis of the crankshaft of the engine; and     a damping means for damping vibration of said auxiliary mechanism;

wherein said auxiliary mechanism is driven by a driving belt which is passed around a crank pulley connected to the crankshaft of the engine and a pulley connected to said auxiliary mechanism, and said damping means comprises at least another driving belt which is passed around a pulley connected to said auxiliary mechanism and a pulley connected to another auxiliary mechanism.

2. An auxiliary mechanism mounting structure as defined in claim 1, wherein said another auxiliary mechanism is disposed above said auxiliary mechanism.

3. An auxiliary mechanism mounting structure as defined in claim 1, wherein said another auxiliary mechanism is disposed below said auxiliary mechanism.

4. An auxiliary mechanism mounting structure as defined in claim 1, wherein said another auxiliary mechanism includes at least two auxiliary mechanisms which are respectively disposed above and below said auxiliary mechanism.

5. An auxiliary mechanism mounting structure as defined in claim 1, in which said auxiliary mechanism is a compressor for an air conditioner.

6. An auxiliary mechanism mounting structure for mounting an auxiliary mechanism on an engine comprising an auxiliary mechanism mounting portion whose bearing rigidity is high in a direction substantially parallel to an axis of a crankshaft of the engine and is low in a substantially transverse direction to that of the axis of the crankshaft of the engine so that the auxiliary mechanism is easy to vibrate in a direction substantially transverse to the direction of the axis of the crankshaft of the engine;

damping means for damping vibration of said auxiliary mechanism; and     a mounting bracket which is fixed to the engine and to which said auxiliary mechanism is fixed,     wherein said damping means comprises a vibration damper which includes a pair of metal plates and an elastic plate positioned between the metal plates and is connected between the mounting bracket and said auxiliary mechanism.

7. An auxiliary mechanism mounting structure as defined in claim 6 in which said auxiliary mechanism is fixed to the auxiliary mechanism mounting portion in a plane which is near the vertical line passing through the center of gravity of the auxiliary mechanism.

8. An auxiliary mechanism mounting structure as defined in claim 6 in which said auxiliary mechanism mounting portion comprises a mounting bracket which is fixed to the engine and to which said auxiliary mechanism is fixed, and said damping means comprises a pair of elastic members which are interposed between an upper portion of the mounting bracket and the engine and between a lower portion of the mounting bracket and the engine.

9. An auxiliary mechanism mounting structure as defined in claim 6 in which said auxiliary mechanism is a compressor for an air conditioner.

* * * * *